July 10, 1934.   A. Y. DODGE   1,965,692
LUBRICATING DEVICE
Filed May 4, 1932

INVENTOR.
ADIEL Y. DODGE
BY
ATTORNEY

Patented July 10, 1934

1,965,692

UNITED STATES PATENT OFFICE 1,965,692

LUBRICATING DEVICE

Adiel Y. Dodge, South Bend, Ind., assignor to The Lubrication Corporation, South Bend, Ind., a corporation of Delaware Application May 4, 1932, Serial No. 609,121

3 Claims. (Cl. 285—175)

This invention relates to improvements in lubrication devices and more particularly to lubricant discharge nozzles adapted to service a plurality of different types of lubricant receiving nipples or fittings.

Lubrication nipples or fittings of the character employed for automotive bearings, machinery and other mechanical moving parts for receiving lubricant from a feeder device may be generally divided into two types. First, that type of lubricant receiving fitting wherein a seal between the servicing nozzle and the fitting may be obtained by clamping the nozzle to the fitting, and that type of fitting wherein a sealing engagement between the nozzle and fitting may be obtained merely by pressing the nozzle against the fitting without effecting clamping engagement. Most types of fittings or nipples designed to be clamped into engagement with a servicing nozzle may also be serviced by a non-clamp nozzle more commonly known as a "contact" nozzle.

An object of the invention is to provide a lubricant discharge nozzle operable as a clamp nozzle for use with that type of fitting designed to be clamped by a clamp type nozzle but which is also operable as a contact nozzle with other types of fittings, in both instances affording an efficient lubricant tight seal during the servicing operation.

A further object is to provide a lubricant discharge nozzle wherein a considerable range in angular movement of the axis of the nozzle relative to the axis of the fitting may be had when the nozzle is employed as a contact nozzle.

A still further object is to provide a lubricant discharge nozzle which may be adapted to either of the various types of fittings with which it is intended to be used without prior adjustment.

Other objects, the advantages, and the uses of the invention will be, or should become apparent after reading the following description and claims and after consideration of the accompanying drawing, in which:

In general, my improved discharge nozzle comprises a hollow barrel A, a conduit B, communicating with the barrel A, provided with a discharge orifice C the side walls of which are spherical, a clamping member D adapted to mechanically engage with one type of fitting and a piston E within the barrel A, secured to the conduit B, for causing relative movement between the conduit B and the clamping member D to clamp the nozzle in engagement tightly with that type of fitting requiring the clamping of the nozzle upon the fitting head.

Figure 1:
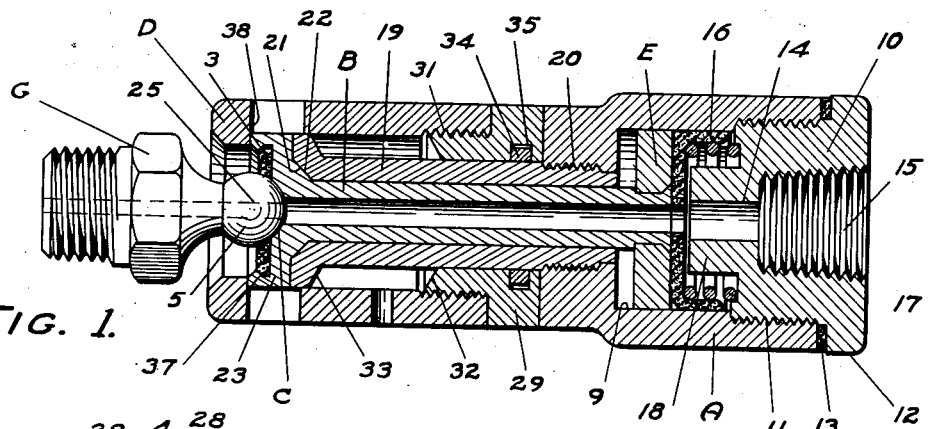
Fig. 1 is a sectional view of my improved discharge nozzle engaged with a fitting of the ball head type.
Figure 2:
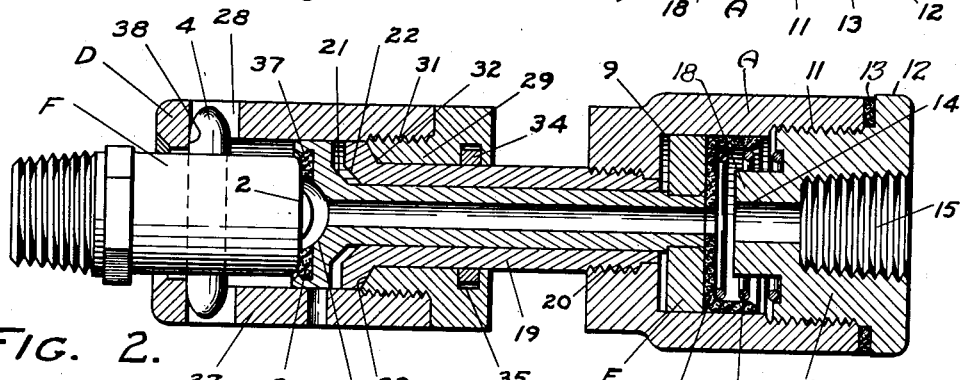
Fig. 2 is a view similar to Fig. 1 illustrating the nozzle engaged with a pin type fitting.
Figure 3:
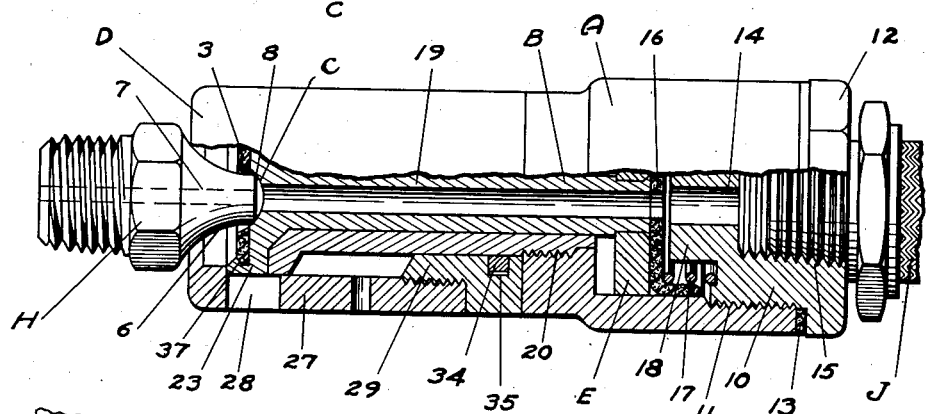
Fig. 3 is a view similar to Fig. 1 illustrating the nozzle engaged with another form of fitting.
Figure 4:
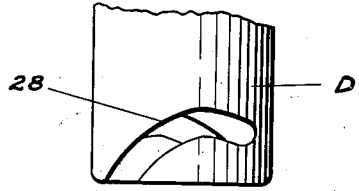
Fig. 4 is a fragmentary side elevation of the outer end of the nozzle.

In Figs. 1 to 3 I have illustrated the nozzle as applied to three varying types of fittings divided into two classes. The fitting F, illustrated in Fig. 2, is known as a pin fitting and is of that type wherein a seal between nozzle and fitting is established between the flat outer end 2 of the fitting head and a sealing washer 3 disposed concentric of the discharge orifice C of the nozzle, mechanical engagement between nozzle and fitting being established by means of a transverse pin 4 extending through the fitting head. The fittings illustrated in Figs. 1 and 3 belong to that general class of fittings wherein contact between the nozzle and fitting head is sufficient to provide the necessary lubricant tight seal under ordinary operating pressures.

The fitting G of Fig 1 is known as a ball head fitting because of its spherical head 5 by means of which universal contact between the nozzle and head may be established to permit a wide angular range of movement therebetween. The fitting H of Fig. 3 has a concave conical head 6 having a centrally located lubricant port 7 intended for engagement with a nozzle by metal to metal contact between the spherical walled discharge orifice C and the relatively sharp annular edge 8 of the fitting head 6.

With reference to Figs. 1 to 3 inclusive, the inner wall of the barrel A provides a cylinder 9 one end of which is closed by a plug 10 inserted therein and secured by screw threads 11. The outer end of the plug 12 is formed with hexagonal side walls so that the plug may be engaged with a wrench and turned into the barrel, tightly, to compress a packing washer 13 therebetween and thus form a lubricant tight seal. A lubricant passage 14 is formed axially through the plug terminating at its rearward end in an internally threaded bore 15 adapted to receive the externally threaded coupler of a lubricant conducting hose J, forming a part of the source of lubricant supply. The piston E has a packing 16, which may be in the form of a leather cup washer as shown, abutting the rearward face of the piston and held in place by a compression spring 17 disposed between the packing and the adjacent wall of the plug 10. A forwardly extending annular projection 18 is formed on the inner wall of the plug 10 for the purpose of limiting the rearward movement of the piston E against the pressure of the spring 17 so as to prevent damage to the skirt of the cup leather.

A tubular member 19 is slidably mounted upon the conduit B and secured at one end to the barrel A by threaded engagement as shown at 20. The forward end 21 of the member 19 is fashioned to closely conform to the rearward surface 22 of the enlarged head 23 of the conduit B within which the discharge orifice C is formed. When the clamping member D and barrel A are moved toward one another so that the adjacent ends abut, as shown in Figs. 1 and 3, the head 23 of the conduit B is arranged to engage with the outer end of the member 19 and the piston E is forced rearwardly against the force of the spring 17 so that the conduit tends to move forwardly.

With the parts in this position the nozzle is prepared for engagement with either of the fittings G and H. When employed with the fitting G the nozzle is thrust forwardly until the spherical surface of the discharge orifice C engages with the complementary spherical surface of the ball head 5. The initial engagement of the fitting, as may be seen, may occur throughout a wide angular range of approach, thus obviating the difficulty encountered in many instances where the fitting is disposed in a position of difficult accessibility. Manual thrust upon the nozzle against the fitting head is transmitted through the spring 17 so as to normally maintain contact under pressure sufficient to form an adequate lubricant tight seal therebetween. Lubricant may be conducted to the fitting through the passage 14 and the conduit B into the fitting through its centrally located lubricant port 25, throughout an angular range of substantially 23° in any direction from the longitudinal axis of the conduit.

In a similar manner, the nozzle may be engaged with the head of the fitting H to establish a lubricant tight seal between the relatively sharp annular edge 8 of the fitting and the spherical side walls of the discharge orifice C. The angular range between nozzle and fitting during the servicing operation is approximately 12° in any direction from the longitudinal axis of the conduit B.

With reference to Fig. 2, the clamping member D comprises a sleeve 27 slidably mounted upon the enlarged head 23 of the conduit B and formed with a pair of opposed bayonet slots 28 for receiving the ends of the pin 4 of a fitting of the type illustrated at F. The rearward end of the sleeve 27 is closed by an apertured plug 29 secured to the sleeve as by threaded engagement 31 and slidably disposed about the tubular member 19. The forward and inner face of the plug 29 is inclined as shown at 32 to conform in contour with the adjacent wall 33 of the forward end of the sleeve 19. A contracting split ring 34 is disposed within an internally grooved portion 35 of the plug to establish friction between the coupling member D and the barrel A with its sleeve 19. The sealing washer 3 is disposed about the outer end of the spherical walled discharge orifice C and held against disengagement from the head 23 by the formation of inwardly flared side walls 37 in that region of the head 23 surrounding the discharge orifice. The opening through the sealing washer 3 may form a continuation of the spherical walls of the discharge orifice C. In order that proper engagement between the pin 4 of the fitting F and the coupling member D may be established, the sleeve 27 is formed with an inwardly extending flange at its outer end providing a shoulder 38 against which the pin 4 may rest. The shoulder 38 also forms an abutment for the forward end of the conduit B when in that position assumed in Figs. 1 and 3.

When used with a pin fitting as shown at F, my improved discharge nozzle becomes a pressure operated clamp nozzle, since this type of interconnection is necessary during the servicing of the fitting. The clamping member D of the nozzle may be initially engaged with the head of the pin fitting by forward thrust along the axis of the fitting accompanied by a rotational movement of the clamp member D so as to provide a bayonet interlock between the pin 4 and the clamping member D. During this operation the clamping member D is moved forwardly away from the barrel A as shown in Fig. 2. As lubricant under pressure is admitted through the passage 14 from the source of supply, the lubricant pressure acting upon the relatively large area of the piston E causes the barrel A to be urged rearwardly and the piston E forwardly. These forces are transmitted through the sleeve 19 and the conduit B to cause relative movement of the outer end of the clamping member D and the discharge orifice C toward one another to compress the sealing washer 3 tightly against the forward end wall 2 of the fitting F and thus establish a lubricant tight seal between the nozzle and the fitting adequate for the conducting of lubricant thereto. When pressure has been relieved the nozzle may be disengaged from the fitting by rotating the clamping member D in the reverse direction and the nozzle is again ready for use with other fittings of the type F, or by merely drawing the barrel and clamping member D toward one another it is in readiness for servicing fittings by metal to metal contact as the fittings G and H.

It is to be understood that the embodiments of the invention herein set forth are presented for the purpose of illustration only, and various changes may be made without departing from the spirit of the invention and the scope of the appended claims.

I claim:

1. A lubricant discharge nozzle including, a discharge conduit adapted to engage with a lubricant receiving fitting for conducting lubricant thereto, a clamping member slidably mounted upon the conduit for engaging with a lubricant receiving fitting, and means for causing relative clamping movement between said clamping member and said conduit when said clamping member is at the forward limit of its travel and for rendering said clamping member ineffective when said clamping member is at the rearward end of its travel relative to the axis of said conduit.

2. A lubricant discharge nozzle including, a discharge conduit adapted to engage with a lubricant receiving fitting for conducting lubricant thereto, a clamping member slidably mounted upon the conduit for engaging with a lubricant receiving fitting, and means responsive to pressure of lubricant subjected to said conduit for causing relative clamping movement between said clamping member and said conduit when said clamping member is at the forward limit of its travel and for rendering said clamping member ineffective when said clamping member is at the rearward end of its travel relative to the axis of said conduit.

3. A lubricant discharge nozzle comprising, a tubular member, a conduit slidably mounted in said tubular member, said conduit having a discharge orifice at one end, means for causing relative longitudinal movement between said conduit and said tubular member, and a clamping member connected through lost motion linkage with said tubular member and adapted to cooperate with the discharge end of said conduit to clamp a fitting therebetween upon relative movement between the conduit and the tubular member.

ADIEL Y. DODGE.